(No Model.)  
2 Sheets—Sheet 1.
W. H. BEEHLER.
Electric Automatic Recording Instrument for Weighing Machines.
No. 240,948. Patented May 3, 1881.
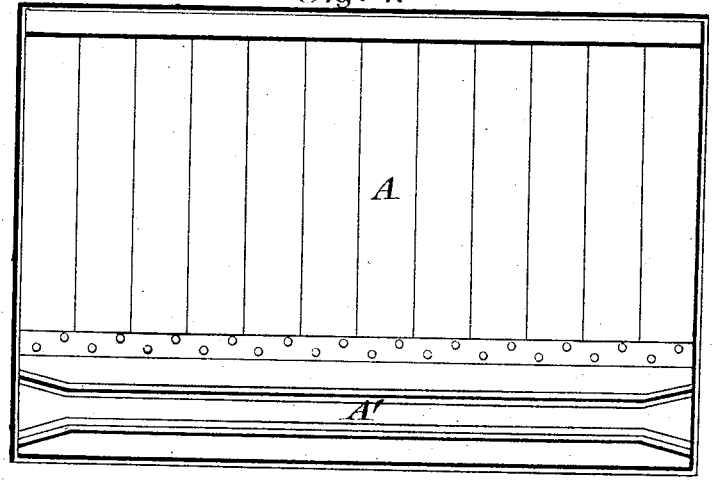
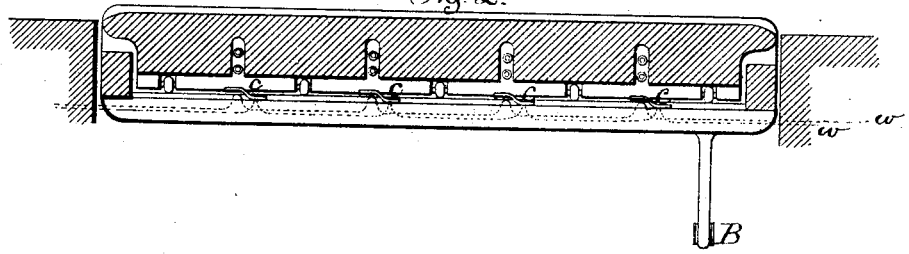
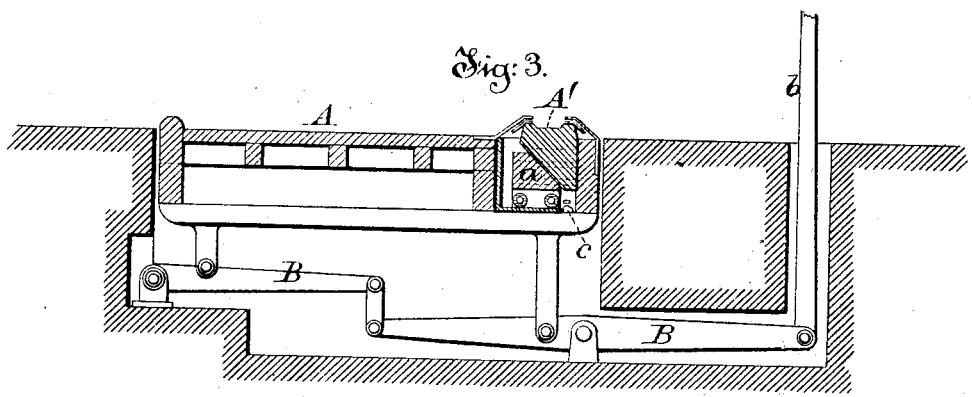
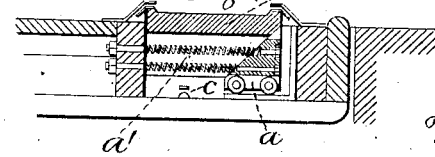
Witnesses  
Miller C. Earl  
Mrs Kittie L French
Inventor  
Wm H. Beehler  
by his Attorney  
Frank L. P.

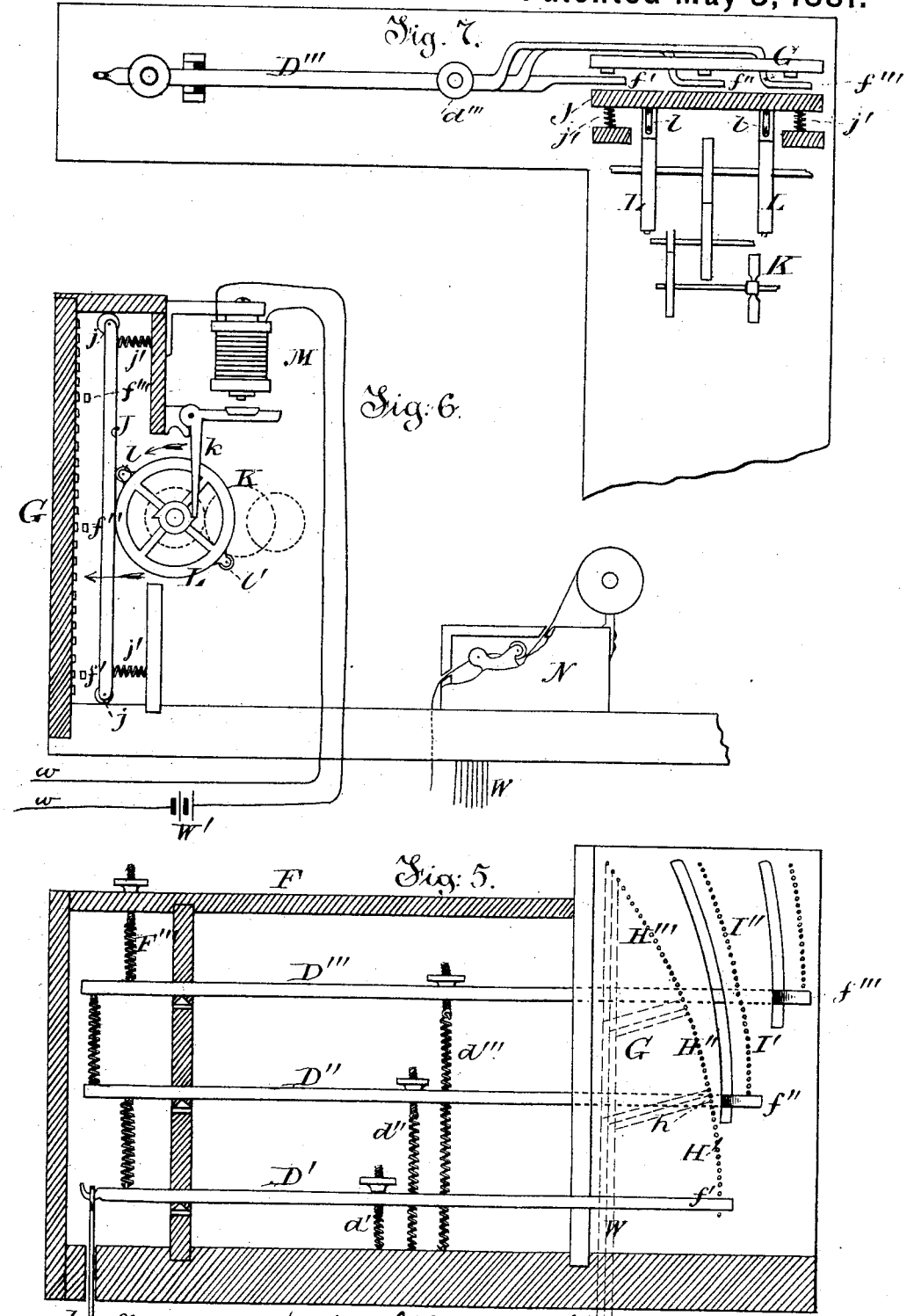

UNITED STATES PATENT OFFICE.

WILLIAM H. BEEHLER, OF NEWPORT, RHODE ISLAND.

ELECTRIC AUTOMATIC-RECORDING-INSTRUMENT FOR WEIGHING-MACHINES.

SPECIFICATION forming part of Letters Patent No. 240,948, dated May 3, 1881.

Application filed March 1, 1881. (No model.)

*To all whom it may concern:*

Be it known that I, WILLIAM H. BEEHLER, a citizen of the United States, residing at Newport, in the county of Newport and State of Rhode Island, have invented certain new and useful Improvements in Electric Automatic Recording Mechanism for Weighing-Machines; and I do hereby declare that the following is a full, clear, and exact description thereof, reference being had to the accompanying drawings.

The object of my invention is to furnish an apparatus which will automatically ascertain the weight of any body which may be placed upon the platform of an ordinary weighing machine or scale, and which will at the same time record the amount of said weight for reference in plain figures, if desirable, so that a correct register may be preserved of all weighing which has been performed upon any scale during a given time without the aid of an attendant.

My invention consists, generally, in arranging one or more balanced levers in connection with the platform on which the body whose weight is to be ascertained is designed to be placed in such a manner that they will come to a state of rest or equilibrium (after the platform has been loaded) in a position varying according to the amount of the load, and in providing a device for closing certain electric circuits which actuate the recording or printing apparatus after the apparatus has come to a state of rest, but not sooner, whereby the record is made to denote with certainty the true weight.

In the accompanying drawings I have shown my invention as applied to one of the ordinary large platform-scales which are employed for weighing carts or wagons loaded with coal, hay, and other similar articles; but I desire to remark that the invention may be readily modified so as to adapt it to the use of the smaller varieties of scales, if desirable.

In the accompanying drawings, Figure 1 is a plan view of the platform of a scale. Fig. 2 is a longitudinal, and Fig. 3 a transverse, section of the same. Fig. 4 is a detached section, showing certain details of the platform. Fig. 5 is a front elevation, partly in section, showing the balanced levers which control the indicating or recording devices. Fig. 6 is a side elevation of the same, partly in section; and Fig. 7 is a top view of a portion of the same.

Referring to Figs. 1, 2, and 3, A represents the platform of a scale, which is set within a pit excavated in the ground, so that its upper surface is flush with the surface of the roadway. The platform A is mounted upon a system of compound levers, B B, arranged in the usual manner, terminating in a vertical rod, $b$, which communicates motion to the balanced levers or scale-beams which serve to indicate or record the amount of weight resting upon the platform. The leverage of the compound system B is so proportioned that a very great weight upon the platform will exert but a comparatively small force upon the rod $b$.

Upon one side of the platform is mounted a guide-track, A', the floor of which is arranged in such a manner as to yield under the pressure of the weight brought upon it by the wheel of a vehicle resting upon it. This may be effected, as shown in Figs. 3 and 4, by making its lower surface inclined, and causing it to rest against a similarly-inclined surface upon a carriage, $a$, running upon rollers. When the track A' descends the carriage $a$ is pressed to one side against the tension of the springs $a'$. (See Fig. 4.)

Underneath the track A' are arranged a series of electric circuit-closers, $c\ c\ c$, which are duplications of each other for additional security of operation. Their office is to close an electric circuit through the wires $w\ w$ whenever the track A' is depressed by the wheel of a vehicle upon the platform, and by this means to set the indicating or recording mechanism in action, as hereinafter explained.

The recording or indicating apparatus is actuated by one or more balanced levers or scale-beams, the arrangement of which will be best understood by reference to Fig. 5. I have shown in the drawings three such levers, which may indicate, for example, tens, hundreds and thousands, although it is obvious that a greater or less number might be used in accordance with the requirements of any particular case. These levers are placed one above the other, their respective fulcrums being in a vertical plane, and the levers parallel to each other when in a state of rest. The upper lever, D''', has its short arm attached by a strong spring, F''', to the stationary frame F of the apparatus. The lever D'' is in like manner attached to D''' and the lower lever, D', is also in like manner attached to D''.

At d', d'', and d''' are adjustable retracting-springs, which may be termed the "registering-springs," which are attached to the respective levers, and which serve to counterbalance the weight upon the platform, as will be hereinafter shown.

The free extremities of the levers D', D'', and D''' terminate in flexible arms f', f'', and f''', which move like indexes over the face of the plate G, which may be termed a "dial-plate."

At H is a row of metallic studs forming electric contact-points, inserted in the plate G, over which the arm f' moves, without quite touching them, except as hereinafter stated.

If, now, the tension of the spring d' be so adjusted that a weight of fifty pounds on the platform A will cause the lever D' to rise until its arm f' reaches the point h upon the plate G, it is obvious that the space H' may be divided into twenty divisions, each of which will correspond to a weight of two and five-tenths pounds. In case the weight upon the platform exceeds fifty pounds and is less than one thousand, the spring F' is so adjusted as to bring the arm D'' into play, which moves over a second row of studs, I; but in case of this arm the tension required to strain the spring d'' is much greater than in the case of the arm D', so that each division of I' represents one hundred pounds. When the weight exceeds one thousand pounds, the third lever, D''', is in like manner brought into action, which is adjusted to denote one thousand pounds by each of its divisions.

The series of studs H' is repeated at H'' and H''', so that there are three sets of twenty divisions each, and the series I' is in like manner repeated at I''. If, for instance, a weight of five hundred and twenty-five pounds be placed upon the platform, the lever D'' will go to the tenth division on the dial I', and the lever D' to the tenth division on the duplicate dial H''. The lever D''' will not be removed at all unless the weight exceeds one thousand pounds, in which case the lever D' will indicate on the third dial, H''', and the lever D'' on the second dial, I''. When the levers D' and D'' and D''' have been brought into a position indicating the amount of the weight which has been placed upon the platform, this weight may be recorded by a suitable registering apparatus operated by electricity. This I effect by means of a series of conducting-wires, W, terminating in the several contact-studs of the series H', and leading to a printing apparatus, N, of any suitable construction, which is so arranged that an electric current traversing a wire from any given stud in the series will vitalize an electro-magnet and actuate a type-lever, which will cause the proper numerical character corresponding to the stud to be impressed upon paper. Branches of the corresponding wires are carried to each stud in the duplicate and triplicate series, as shown in Fig. 5, so that the same effect is produced in any case, whether the contact is made in one or another of the duplicate series of studs.

It now remains to be shown how the arms f', f'', and f''' are pressed into contact with the studs upon the plate G after the levers have assumed a proper position corresponding with the weight upon the platform.

A carriage, J, is arranged to move freely in a horizontal direction, being mounted upon rollers or wheels j j, and is retained in its normal position by means of springs j' j'; but when caused to move horizontally in the direction of the arrow it presses the arms f', f'', and f''' into contact with the studs upon the plate G, which they stand opposite to at the moment the carriage is moved.

It is obvious that a certain period of time must elapse after a weight has been placed upon the platform A before the arms f', f'', and f''' will settle into a state of rest or equilibrium, and it is therefore necessary that the carriage J should not be allowed to act upon said arms for the purpose of recording the weight until the proper time has elapsed. This result is effected by imparting motion to the carriage by means of a time-train, K, similar to that of a clock, which may be driven by a wound-up weight or spring or other power, and is released by means of a detent, k, controlled by an electro-magnet M. The wires w w, which conduct the electric current from a battery, w', to this electro-magnet M, are connected to the circuit-closers c c beneath the platform in Fig. 1, so that whenever a weight is brought upon the platform A the circuit of the battery w' is closed, the magnet M is vitalized, and the time-train K set in action. This time-train is so arranged and adjusted that when released it will cause the wheel L to move forward through one-half of a complete revolution, and then come to rest with the detent k in position to lock the mechanism, ready to be released again by the next action of the electro-magnet. At opposite points on the circumference of the wheel L are two rollers, l and l', which operate the carriage J as follows: When the wheel L commences to revolve in the direction of the arrow the roller l presses against the carriage J and gradually forces it against the arms f', f'', and f''', and causes them to make contact with the studs upon the plate G. The time occupied by the time-train in performing this operation may be regulated at pleasure, the essential point being to allow time for the arms to come to a state of rest before the indication is taken off.

Any suitable recording or printing device may be used for the registering of the indications. I prefer to use a printing-machine, N, which may be arranged with sets of numerals in the form of type upon levers, so as to be impressed upon paper by electro-magnetism.

Each stud of the several groups of studs on the plate G in Fig. 5 has an independent wire or circuit connecting that particular stud with an electro-magnet and printing-lever, which impresses the figures denoting the corresponding weight upon the paper whenever the electric current is closed through that stud by the pressure of the carriage J against the arms $f'\ f''\ f'''$.

It is to be observed that branch connections are made to the same wire from the corresponding studs in the different series H′, H″ and H‴, so that when the contact is made with either one of the three a like effect will be produced upon the recording apparatus.

The closure of the circuit upon the studs by the action of the carriage only continues for a brief period, as the wheel L continues to move until it has passed through one-half of a complete revolution, which permits the carriage to return to its normal position, as shown in the drawings, by the action of the springs $j'\ j'$.

I do not desire to confine myself to the use of any particular description of registering apparatus, as it is obvious that by the employment of a separate electric circuit for each stud upon the plate G in the manner shown various means of recording the same upon paper by the action of electro-magnetism might be made use of in this connection.

I claim as my invention—

1. The combination, substantially as hereinbefore set forth, of a printing recording mechanism, a series of electrical contacts, a platform, one or more arms or scale-beams whose position of equilibrium is determined by the weight resting on the said platform, and mechanism, substantially such as described, whereby the position of the arm or arms is indicated by forming an electrical connection through the contact point or points opposite thereto.

2. The combination, substantially as hereinbefore set forth, of a platform, a circuit-closer operated by said platform, an electro-magnet, a detent operated thereby, a time-train, and printing or recording mechanism.

3. The combination, substantially as hereinbefore set forth, of a platform, two or more balanced arms or scale-beams arranged to be brought automatically into successive action by a weight upon the platform, and two or more series of electric contact-points.

4. The combination, substantially as hereinbefore set forth, of a platform, a guide-track mounted upon said platform, and an electric circuit-closer brought into action by the depression of the guide-track.

5. The combination, substantially as hereinbefore set forth, of a time-train, a carriage operated or controlled thereby, and two or more electric circuit-closers actuated by said carriage at the termination of a definite period of time after the release of the time-train.

In testimony whereof I have hereunto subscribed my name this 27th day of September, A. D. 1880.

WILLIAM H. BEEHLER.

Witnesses:
MILLER C. EARL,
FRANK L. POPE.